Dec. 16, 1930.    H. HEUSER    1,785,447
ALDEHYDE FREE ALCOHOLIC LIQUIDS
Filed June 28, 1926
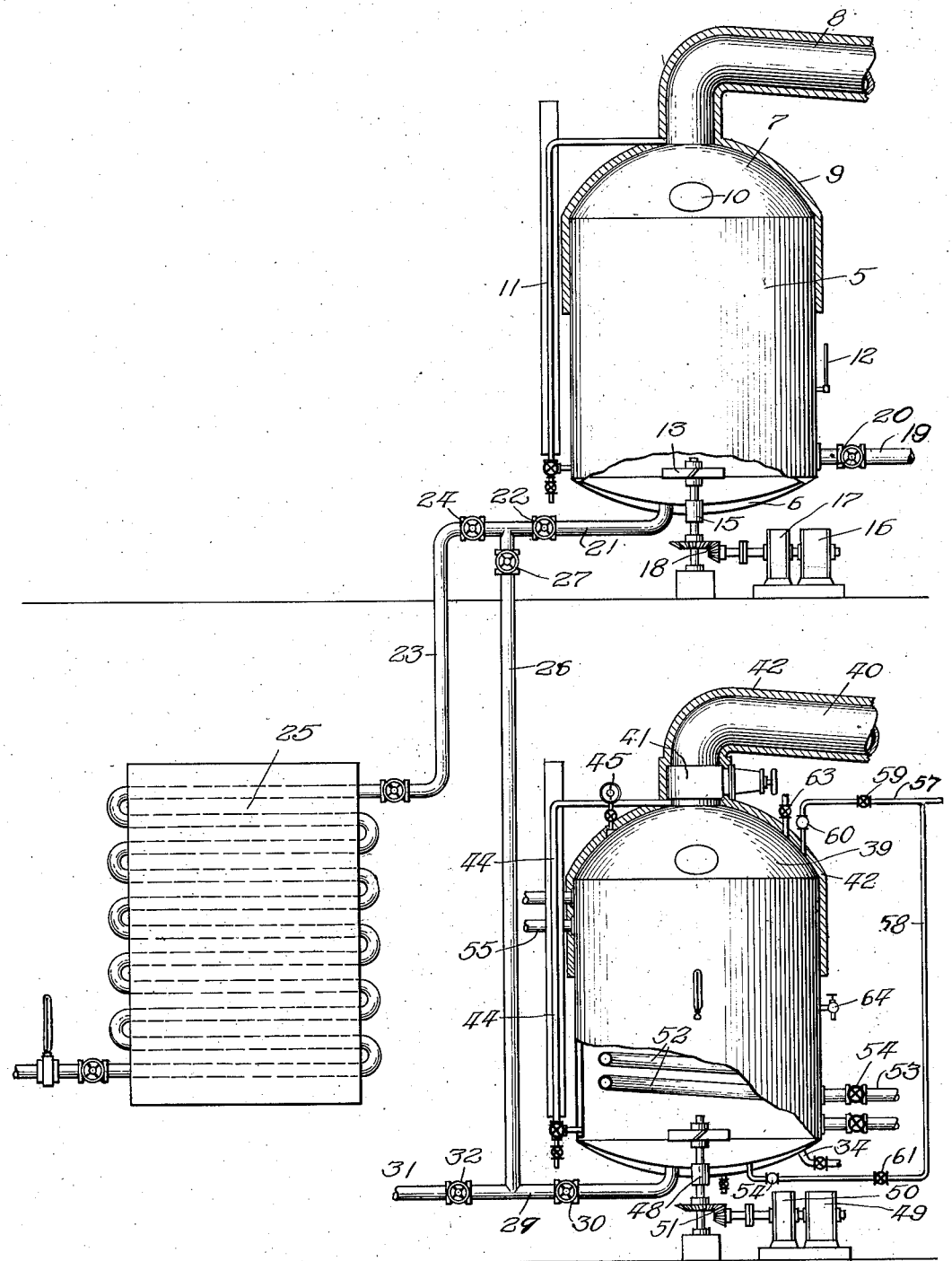

Patented Dec. 16 1930

1,785,447

UNITED STATES PATENT OFFICE

HERMAN HEUSER, OF CHICAGO, ILLINOIS

ALDEHYDE-FREE ALCOHOLIC LIQUIDS

Application filed June 28, 1926. Serial No. 119,057.

The present invention relates to the production of liquids containing ethyl alcohol derived by fermentation and which are free from aldehydes as well as from fusel oil and other toxic products of fermentation. Thus, my invention may be employed for the production of fermented malt liquids of the tonic or medicinal type as well as of fermented fruit juice liquids when the manufacture thereof is permissible for sacramental, medicinal or other purposes or as an intermediate for the manufacture of other material.

The invention will be fully understood from the following description, illustrated by the accompanying drawing, in which apparatus suitable for carrying the invention into effect is diagrammatically illustrated, partly in section.

In the manufacture of liquids of the type described above, and containing alcohol, it has not hitherto been recognized that the toxicity ordinarily ascribed to the alcohol is due to fusel oils and especially to aldehydes and like oxidized products, and that the same also have a distinctly deleterious effect on other characteristics of the liquid. I have found that these accompanying materials are very toxic, particularly the aldehydes, the toxicity of which is apparently enhanced by their volatility and peculiar chemical reactivity. The absence of the toxic substance entirely deprives the material of physiological toxicity, even with pure ethyl alcohol present in proportions as high as 3 to 6%. Furthermore, I have found that certain of the deleterious physiological effects, as well as other characteristics hitherto regarded as due solely to the alcohol present in liquids, particularly when in small proportions, are in fact due to the presence of aldehydes which I have found, by careful research and by the development of sensitive, accurate analytical tests, to be present in all alcoholic liquids including chemically pure alcohol as hitherto produced. The aldehydes may be formed during the manufacture of the liquid or by subsequent oxidation (as by surface contact with air), and in aqueous solutions of alcohol as well as in other alcoholic liquids produced by fermentation or by subsequent distillation.

By methods which I have discovered and which are fully set forth hereinafter, I have been able to produce and to retain in marketable form liquids containing alcohol and free, not only of fusel oil, buc also of aldehydes, and hence free from toxic and intoxicating effect hitherto regarded as necessarily present in such material. My process and products are of particular value when the liquids are employed medicinally, owing to the absence of the toxic action of the aldehydes, etc., normally present.

In the following description of my invention, I have set forth a particular embodiment of apparatus and have, for convenience in description, referred to a fermented malt-cereal liquid of suitable extract percentage, as the initial material. It will be readily understood that other apparatus may be employed and that such materials may be employed, as, for example, a fermented fruit juice, or a distilled and diluted product intended for medicinal purposes. The initial material employed may be considered as containing 5% of alcohol by volume and the legally required extract percentage in the specific example set forth.

Referring to the drawing, the numeral 5 designates a kettle, shown partially in section, provided in its base with a steam-jacket 6. The upper portion of the kettle is suitably domed, as at 7, and is provided with a vapor-outlet pipe 8, which may suitably lead to a condenser or open directly into the atmosphere, as desired. The vapor-outlet pipe 8 is suitably of goose-neck type, and the upper portion of the kettle 5, the dome 7, and the portion of the vapor-outlet pipe 8 from which condensate, if formed, may run back into the kettle are provided with lagging or thermal insulation of any suitable effective type, as indicated at 9, for the purpose of preventing condensation as hereinafter more fully set forth. The kettle is suitably provided with a manhole 10, a liquid gauge 11 and a thermometer 12, together with any other desired control and inspection devices. In the lower portion of the kettle there is provided a stirrer 13 mounted on a vertical shaft 14 which passes through a suitable stuffing box 15 in the bottom of the kettle, the shaft 14 being driven in any suitable manner, for example, by motor 16 through speed reducer 17 and the gearing 18. The pipe 19 provided with valve 20 serves as an inlet to the interior of the kettle 5. The contents thereof may be discharged through the pipe 21 provided with valve 22.

The liquid discharged through the pipe 21 may be directed in either of two paths, either through line 23 provided with valve 24 to a continuous cooling device 25, or through the line 26 provided with valve 27 to the kettle 28. It will be understood, of course, that when the liquid is discharged through the pipe 23, the valve 27 leading to the pipe 26 is closed; and that when the liquid is discharged through the pipe 26 to the kettle 28, the valve 24 in the line 23 is closed.

In the flow of the liquid to the kettle 28, it passes through the pipe 26 into the pipe 29 leading into the bottom of the kettle, the latter pipe being provided with valve 30. A branch pipe 31 provided with valve 32 also connects with the pipe 29, so that the contents of the kettle 28 may be discharged through the pipes 29 and 31 from the system.

The kettle 28 is in form generally similar to the kettle 5 already described, being provided in its base with a jacket 33 to which steam may be supplied through a valved pipe 34. The kettle 28 is likewise provided around its side walls with a jacket 35, which does not communicate with the jacket 33, and to which water or other suitable cooling medium may be supplied through the valved pipe 36, making its exit through the pipe 37. The upper portion of the kettle 28 is domed, as at 39, and is provided with a vapor pipe 40, a valve 41 of gate or other suitable type being provided in the outlet pipe 40 as close to the top of the kettle as is practicable. To prevent condensation, the upper portion of the kettle and the vapor-outlet pipe are lagged with any suitable thermal insulation, as indicated at 42. The kettle 28 is provided with any desired control and observation devices, for example, thermometer 43, liquid gauge 44 and pressure gauge 45.

In the lower portion of the kettle 28 there is provided a stirrer 46, similar to the stirrer 13 provided in the kettle 5. The stirrer 36 is suitably mounted upon a rotatable vertical shaft 47 which passes through a stuffing box 48 in the bottom of the kettle, and is driven by any suitable device, for example, by the motor 49 through the speed reducer 50 and the gearing 51. Within the kettle 28 there are likewise provided a series of coils 52, to which brine or other suitable cooling medium may be supplied through the inlet pipe 53 provided with valve 54. The cooling medium may make its exit from the coils 52 through the outlet pipe 55. A pipe 56, leading from any suitable source of carbon-dioxide under pressure, divides into two branches 57 and 58, the former leading to the upper portion of the kettle 28 and the latter into the kettle at its bottom. The line 57 is provided with a control valve 59 and a check valve 60. The line 58 is provided with a control valve 61 and a check valve 62. A vent 63 controlled by a valve is provided in the upper portion of the kettle. Samples of the contents of the kettle may be removed through the sampling cock 64.

In order that the invention may be clearly understood, it will be described in connection with the treatment of a specific material, which may be, for example, a fermented liquid of the malt-cereal type containing initially about 5% of alcohol by volume and the necessary extract percentage. In starting operations, the fermented liquid is run into kettles 5 and 28, which are of substantially equal capacity, until they are each a little more than half full. Thus, if the capacity of each of the kettles is 200 barrels, 105 barrels may be run into each. The stirrers 13 and 46 in the two kettles are then started in operation and the liquid in each kettle is heated to boiling by supplying steam to the jackets in the bottoms of the kettles. The gate valve 41 of kettle 28 is kept open. Assuming that the liquid employed has an alcohol content of 5% by volume, it will begin boiling at 95.8° C. The kettles being only a little more than half full, ample room is provided for the foam formed at the beginning of boiling. Boiling is continued until the vapors given off from the liquid are free from the characteristic fusel oil odor, which is present in them in the beginning of the operation. In the specific instance cited, the liquid is entirely free from fusel oil and from aldehydes when it has been reduced to an alcohol content of 3.50% by volume, at which point its boiling point at the altitude of Chicago is 97° C. The volume of the liquid at this point is reduced to about 100 barrels in each kettle at the boiling temperature, corresponding to about 95.7 barrels of cold liquid in each kettle, 8.86% of liquid having been evaporated.

When the point is reached at which the fusel oil and aldehyde is removed as above indicated, only sufficient steam is supplied to keep the liquid in the two kettles sufficiently hot (near the boiling point) to maintain a sufficient evolution of vapors to prevent access of air and aldehydes. During this entire operation, the lagging on the upper portion of the kettles prevent any return of reflux and aids in the elimination of aldehydes from the liquid residue.

While the liquid residues in the two kettles are kept hot (near the boiling or simmering point), the valve 22 in the line 21, the valve 27 in the line 26 and the valve 30 in the line 39 are opened, and the entire body of liquid residue from the kettle 5 is discharged into the kettle 28. The flow of residue continues until the level of liquid in the kettle 28 reaches the gate valve 41, which point can be readily observed by means of the gauge 44. The valve 41 is then closed tightly, so that the kettle 28 is entirely filled with residue which is entirely freed of fusel oil and aldehydes and which contains no air or oxygen. At this stage the alcohol content of the residue is about 3.25 to 3.5% by volume.

The residue in the kettle 28 is then cooled preferably, first by passing cold water through inlet pipe 36 to and through the jacket 35 around the kettle and out through the outlet pipe 37. When the residue has been partially cooled, for example, to about 32° C. the flow of water through the cooling jacket 35 is stopped, it is preferably drained, and the cooling is continued by flowing cold brine through inlet pipe 53, coils 52 within the tank and out of the outlet pipe 55. It is thereby brought to a temperature of 2° C. or lower when cooling is stopped. The volume of residue is reduced by cooling from 200 barrels hot residue to somewhat more than 191 barrels cold residue, the contraction being noted on the liquid gauge 44. In the operation as described, the space in the kettle above the cooled residue is highly evacuated, it being understood that if the kettle has not sufficient strength to withstand the strains set up by cooling, a gas completely free from oxygen, such as carbon-dioxide or nitrogen previously passed through an active oxygen absorbing medium, may be permitted to enter the top of the kettle, for example, through the line 57, during the cooling operation. No oxygen is permitted to come in contact with the surface of the cooling liquid for I have discovered that if the residue is cooled in the presence of an oxygen containing gas, up to 0.40% by volume of oxygen is dissolved and there is a substantial oxidation of the alcohol content to aldehydes, readily noticeable by the strong characteristic odor of a sample taken from the sampling cock 64.

After the residue has cooled, any vacuum or partial vacuum remaining in the kettle is broken by the introduction of carbon-dioxide through the lines 56 and 57, the carbon-dioxide being supplied, for example, under a pressure of about 25 lbs. gauge until a desired pressure is secured in the kettle. About 10 lbs. gauge has been found to be adequate. The residue may be forced by this pressure to the cold storage room, where it may be stored in containers, from which air is preferably previously removed, for example, by means of carbon-dioxide. It may then be made ready for the market by carbonating, filtering, bottling and pasteurizing in the bottles. Other trade packages may be employed, but bottles are preferred because the access of oxygen to the liquid, with the resultant formation of aldehydes from its alcohol content is more easily prevented. If desired, a small proportion of a phosphite or hypophosphite or of hypophosphorus acid may be added to the material before it is packaged; for example, the equivalent of 4 to 12 grams of an alkali metal phosphite or hypophosphite may be so added per barrel of the liquid.

If desired, instead of carbonating in the usual manner, the cooled liquid may be carbonated in the kettle 28 in bulk. After the liquid has been cooled to the desired low temperature, as set forth above, the rotation of the stirrer 46 is continued, for example, at a rate of 60 to 65 revolutions per minute, and the carbon-dioxide is allowed to enter the chamber from the line 56 through line 58, valve 61 and valve 62. The pressure within the kettle gradually rises until a pressure slightly under that of the source of carbon-dioxide is reached. In order to continue the flow of the carbon-dioxide, the vent 63 may be slightly opened at this point, a small amount of carbon-dioxide permitted to escape and a continuous flow of the carbon-dioxide into the beverage produced. After the liquid has been carbonated, it may be packaged in any suitable manner in use in the trade, the same precautions being taken to avoid acess of oxygen containing gas or air as has been previously mentioned.

The heating or boiling of fermented worts and similar liquids in the ordinary manner imparts thereto a burnt or empyreumatic taste and odor; but by operating in accordance with my invention in which air is not permitted access nor contact with the liquid or residue, this burnt taste and odor is avoided.

If, desired, instead of carrying out the operation in the manner above set forth, the liquid from the kettle 5, when completely deprived of the fusel oil and aldehydes present therein, may be discharged through the lines 21 and 23 through the cooler 25, the line having previously been freed from air or oxygen containing gas either by flowing an air-free liquid therethrough or by passing an air-free gas, such as carbon-dioxide therethrough. During the time that any liquid remains in the kettle 5, it must be kept at or sufficiently near the boiling point, so that air will not be permitted access to the liquid and absence of aldehyde formation in the liquid and return thereto assured.

I have found that in general the desired expulsion of fusel oil and aldehydes from a fermented liquid of the character above referred to, containing, for example, 3 to 7% alcohol and the permissible percentage of extract may be affected by continuing the boiling or evaporation until 25 to 40% of the alcohol (by volume) has been removed. If desired, the alcohol content of the residue may be supplemented by the addition thereto of an aldehyde-free ethyl alcohol solution in water. Ordinary commercial ethyl alcohol or solutions containing it cannot be employed, as even when prepared under the most careful conditions as hitherto known, they contain detectable quantities of aldehydes capable of substantially affecting the toxicity and intoxicating action of the liquid. I prefer, therefore, to prepare a solution of ethyl alcohol free from aldehyde, using the procedure above set forth in connection with the manufacture of the aldehyde and fusel oil free residue from fermented liquids. In place of charging the kettles 5 and 28 with fermented liquid, as hereinbefore set forth, they may be charged with an aqueous solution of chemically pure alcohol containing, say 5 to 50% alcohol and the operation conducted in exactly the manner above set forth. An aldehyde-free alcohol solution containing 4% alcohol, or higher, depending upon the strength of the alcohol solution originally taken, may thus be produced and is found to differ markedly from a solution of alcohol made in the ordinary manner being entirely free from any odor or the usual alcohol sweetness. It is apparent that a sample of this liquid must be tested or examined at once upon withdrawal, as there is a rapid absorption of oxygen with a formation of quantities of aldehyde which appreciably affects the taste and order of the liquid and are qualitatively and quantitatively detectable by sensitive methods of analysis. If it is desired that the liquid shall retain its characteristics of absence of aldehyde taste and flavor and the absence resulting therefrom, it must be retained in containers from which air or other oxygen containing gases are excluded unless the ethyl alcohol content of the beverage or liquid is less than 4% by volume. Below this proportion, the material may be in contact with air for an appreciable length of time without producing aldehydes.

In carrying out my invention, I prefer to apply indirect heat to the liquid under treatment, as the use of direct steam injection for heating introduces substantial quantities of air or oxygen.

The operation may be conducted under greater or less vacuum, if desired, but I have found that, with reduction in pressure, it is necessary to cause a greater proportional evaporation of the alcohol (and hence of the liquid) than under atmospheric pressure to effect the removal of the fusel oil. Furthermore, in operating in vacuo and in the subsequent handling of the liquid I have found that there is much greater difficulty in securing freedom from aldehydes.

This application is in part a continuation of my application Serial No. 480,817, filed June 27, 1921.

I claim:

1. The method of producing an alcoholic liquid free from fusel oil and aldehyde, which comprises boiling an alcohol containing liquid in which fusel oil or aldehydes are present to reduce its alcohol content 25 to 40%, and separating from the residue the evolved vapors, thereby removing from the residue its fusel oil and aldehyde content, discharging the residue at boiling temperature into a chamber, completely filling the latter chamber with said residue at boiling temperature, sealing the chamber, and cooling the residue.

2. The method of producing an alcohol containing liquid free from fusel oil and aldehyde, which comprises boiling an alcoholic liquid in which fusel oil or aldehydes are present to remove therefrom as vapors a portion of its alcoholic content sufficient to carry off also the fusel oil and aldehyde present, and separating said vapors from the residue, completely filling a container with such residue while at boiling temperature, sealing the container and cooling the residue therein.

3. The method of producing an alcohol containing liquid free from fusel oil and aldehyde, which comprises heating an alcoholic liquid in which fusel oil or aldehydes are present to cause evaporation thereof until the fusel oil and aldehyde have been removed as vapors, separating the vapors from the residue, a portion of its alcohol remaining therein, and thereupon cooling the alcoholic residue liquid in the absence of air or oxygen.

4. The method of producing an alcohol containing liquid free from fusel oil and aldehyde, which comprises evaporating an alcoholic liquid in which fusel oil or aldehydes are present, until the fusel oil and aldehyde have been removed, as vapors, and separating such vapors and accompanying vapor materials from the residue, maintaining a body of the residue in an open vessel while heating the same sufficiently to prevent access of air and aldehyde formation, and withdrawing residue from said heated body and cooling the withdrawn residue.

5. The method of producing an alcohol containing liquid free from fusel oil and aldehyde, which comprises boiling an alcoholic liquid in which fusel oil or aldehydes are present to remove therefrom as vapor a portion of its alcoholic content sufficient to carry off also fusel oil and aldehyde present, separating from the alcohol-containing residue the removed alcoholic and accompanying vapors, completely filling a container with such residue while at boiling temperature, sealing the container and cooling the residue therein, and permitting an oxygen free gas to enter the space within said chamber formed by reduction of volume of the residue on cooling.

6. The method of producing an alcoholic liquid free from fusel oil and free from aldehyde, which comprises boiling a fermented cereal liquid containing initially about 5% alcohol by volume to reduce its alcohol content to about 3.50% by volume, thereby removing fusel oil and aldehyde therefrom, as vapors, and separating such vapors and accompanying vapor materials from the residue, charging such residue while at boiling temperature into a container to completely fill the latter, sealing the container, and cooling it in the sealed container.

7. The method of producing an alcoholic liquid free from fusel oil and free from aldehyde, which comprises boiling a fermented cereal liquid containing initially about 5% alcohol by volume to reduce its alcohol content to about 3.50% by volume, thereby removing fusel oil and aldehyde therefrom, as vapors and separating such vapors, and accompanying vapor materials from the residue, charging such residue while at boiling temperature into a container to completely fill the latter, sealing the container, and cooling it in the sealed container while permitting air-free gas to enter the space left by the residue on cooling.

8. The method of producing an alcoholic liquid free from fusel oil and free from aldehyde, which comprises boiling a fermented cereal liquid containing initially about 5% alcohol by volume, to reduce its alcohol content to about 3.50% by volume, thereby removing fusel oil and aldehyde therefrom, as vapors and separating such vapors and accompanying vapor materials from the residue, charging such residue while at boiling temperature into a container to completely fill the latter, sealing the container, and cooling it in the sealed container, and forcing a continuous stream of carbon-dioxide into the cooled residue while vigorously agitating the same.

9. The method of producing an alcoholic liquid free from fusel oil and free from aldehydes, which comprises boiling a fermented cereal liquid containing initially about 5% alcohol by volume, to reduce its alcohol content to about 3.50% by volume, thereby removing fusel oil and aldehydes therefrom, as vapors and separating such vapors and accompanying vapor materials from the residue, charging such residue while at boiling temperature into a container to completely fill the latter, sealing the container, and cooling it in the sealed container, forcing a continuous stream of carbon-dioxide into the cooled residue, while vigorously agitating the same, and venting excess carbon-dioxide from the container.

10. The method of producing a cereal liquid of reduced alcohol content, free from burnt taste and flavor, which comprises boiling an alcohol-containing beverage stock to vaporize a part of its alcohol together with its aldehydes, separating from the alcohol-containing residue the evolved alcoholic and accompanying vapors, cooling the boiled beverage in the absence of air or oxygen and thereupon carbonating and filtering it.

11. The method of producing an aldehyde-free liquid from an alcoholic liquid in which fusel oil or aldehydes are present which comprises charging a portion of such liquid into a closed chamber, heating it therein to evaporate and remove therefrom its entire aldehyde contents together with a portion of its alcoholic contents, similarly heating a second portion of said liquid in a second chamber, discharging the aldehyde-free residue from the second chamber, while boiling, into the first chamber to completely fill the latter, sealing the first chamber, while its contents are at boiling temperature, and subsequently cooling its contents.

12. The method of producing an aldehyde-free liquid from an alcoholic liquid in which fusel oil or aldehydes are present which comprises charging a portion of such liquid into a closed chamber, heating it therein to evaporate and remove therefrom its entire aldehyde contents together with a portion of its alcoholic contents, similarly heating a second portion of said liquid in a second chamber, discharging the aldehyde-free residue from the second chamber while boiling into the first chamber to completely fill the latter, sealing the first chamber while its contents are at boiling temperature, subsequently cooling its contents, and permitting an oxygen-free gas to enter the space formed by contraction of the contents of the chamber.

13. In the manufacture of alcohol-containing liquids from alcohol-containing stocks, the steps of boiling the stock and separating from the residue the evolved vapors containing aldehydes and part of the alcohol of the stock, and thereupon cooling the boiled residue without access to or absorption of oxygen or air.

HERMAN HEUSER.